Figure 4:
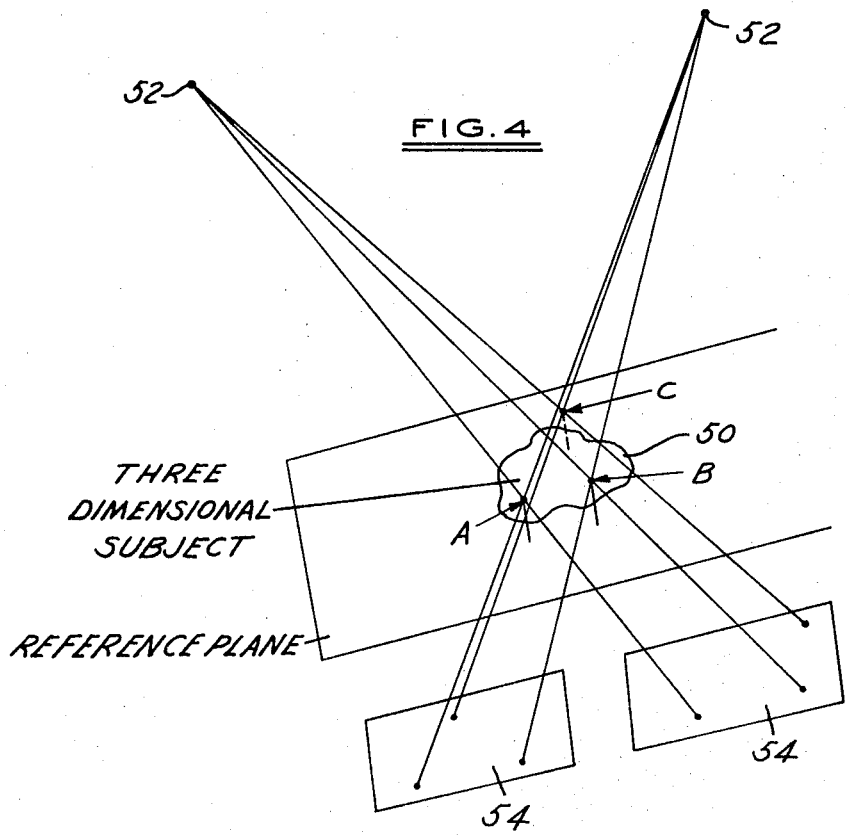

United States Patent [19]

Richards

[11] 3,742,236

[45] June 26, 1973

[54] METHOD AND APPARATUS FOR VARIABLE DEPTH LAMINAGRAPHY

[76] Inventor: Albert G. Richards, 395 Rock Creek Dr., Ann Arbor, Mich. 48104

[22] Filed: Oct. 7, 1970

[21] Appl. No.: 78,880

[52] U.S. Cl. ........................... 250/321, 250/313, 323
[51] Int. Cl. ........................................... G01n 23/02
[58] Field of Search ...................... 250/60, 61, 61.5, 250/65 R

[56] References Cited
UNITED STATES PATENTS

| 3,499,146 | 3/1970 | Richards ............................ 250/61.5 |
| 3,509,337 | 4/1970 | De Clerk et al. .................. 250/61.5 |

FOREIGN PATENTS OR APPLICATIONS 487,389  12/1938  Great Britain ..................... 250/61.5

*Primary Examiner*—William F. Lindquist
*Attorney*—Barnard, McGlynn and Reising

[57] ABSTRACT

Method and apparatus for variable depth laminagraphy including means to be exposed with the subject to provide reference points on exposed film to facilitate the cutting of reference edges of the film, these edges serving to locate various film exposures relative to each other in a viewing apparatus designed to control relative shifting of the film to create laminal planes for inspection and study.

13 Claims, 9 Drawing Figures

PATENTED JUN 26 1973 3,742,236
SHEET 1 OF 2
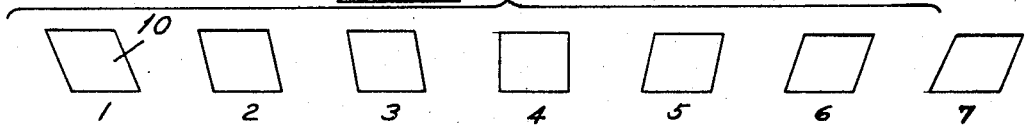
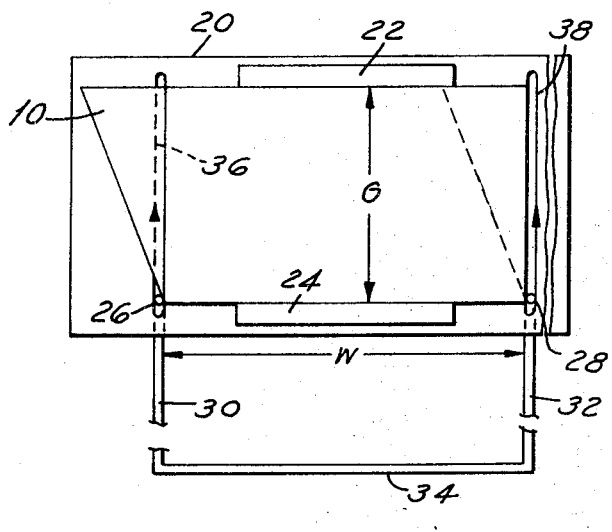
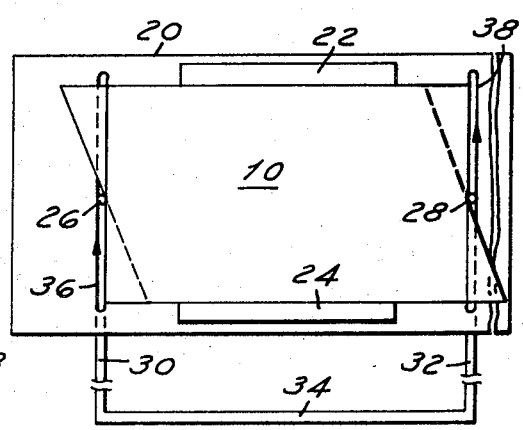
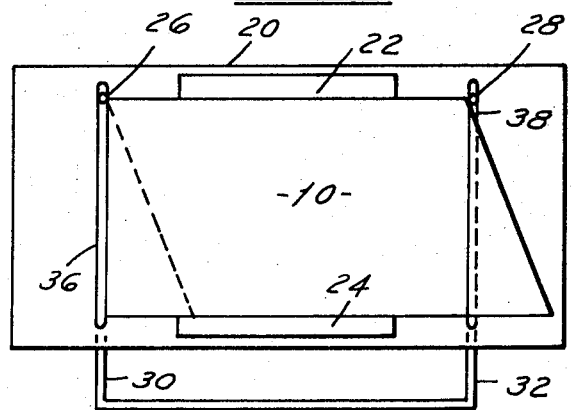
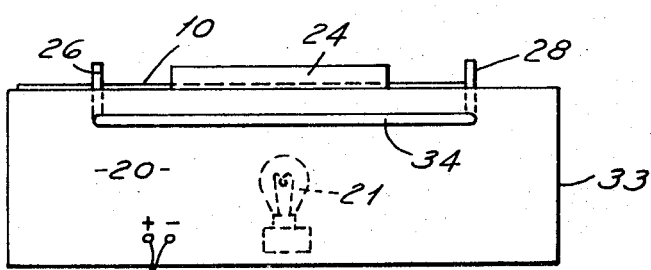
INVENTOR
ALBERT G. RICHARDS
BY
Barnes, Kisselle, Raisch & Choate
ATTORNEYS INVENTOR
ALBERT G. RICHARDS
BY
Barnes, Kisselle, Raisch & Choate
ATTORNEYS ns.
METHOD AND APPARATUS FOR VARIABLE DEPTH LAMINAGRAPHY This invention relates to a Method and Apparatus for Variable Depth Laminagraphy as described in U. S. Pat. No. 3,499,146, dated Mar. 3, 1970, issued to Albert G. Richards.

It is an object of the present invention to provide a system and apparatus for radiographing a subject in a manner which permits reconstruction of the images of details in a plane at any particular selected depth within the subject.

It is also an object of the present invention to provide a system for radiographing a subject according to the linear movement of laminagraphy and the methods described in the referenced patent whereby each exposure contains reference markers which provide sufficient information to define the manner of superposition with all other exposures to obtain details of a particular lamina.

It is a further object to provide a system utilizing said markers to cut each film so exposed and processed into a parallelogram with edge angles established according to the positions determined by the markers.

It is also an object to provide a system utilizing said parallelograms in superposition to control the relative planar shift of each film in order to register data from any one plane of location of the subject to highlight said data to permit inspection of detail in various selected lamina.

It is a further object to provide a record of individual exposures to radiation which facilitates the shaping of individual exposed sheets or film to render them ready for an apparatus designed to shift the sheets in overlay in a proper relative motion to obtain most effective laminate definition.

Other objects and features of the invention will be apparent in the following description and claims in which the principles and the manner of use of the invention are set forth in the best mode presently contemplated.

Drawings accompany the disclosure and the various views thereof may be briefly described as follows:

FIG. 1, a diagrammatic presentation illustrating the manner in which exposed films must be shifted relative to each other to develop the laminal planes for inspection.

FIG. 2, a diagrammatic presentation showing the shapes of exposed film which permit proper positioning in an apparatus to create relative motion.

FIGS. 3A, 3B, and 3C, top views of a viewing box with a motion apparatus associated therewith shown in various relative positions.

FIG. 3D, a side elevation of the apparatus shown in FIGS. 3A to 3C.

FIG. 4, a diagrammatic view illustrating the manner in which reference objects are positioned relative to a subject to be exposed.

Figure 5:
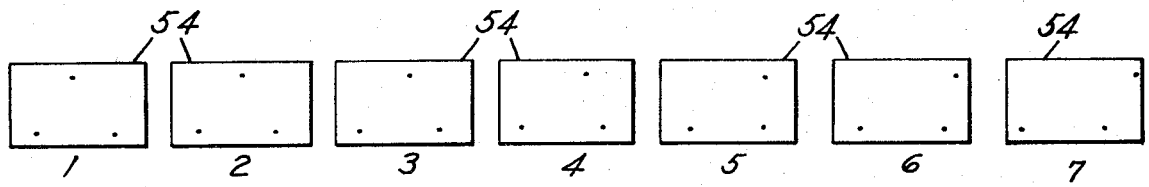

FIG. 5, a view of a series of exposed films showing the imprint of the reference objects in series.

Figure 6:
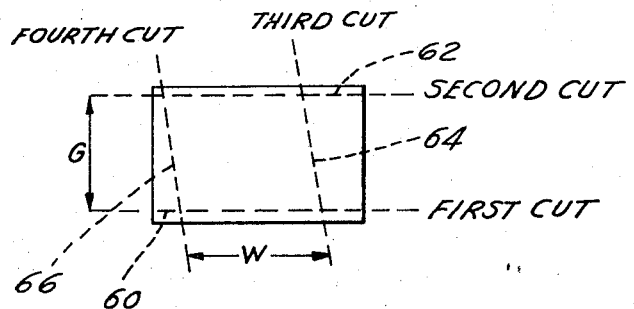

FIG. 6, an illustration of the manner in which an exposed film is cut for proper shaping.

The laminagraphic movement of the source and film may be in the form of a line, circle, spiral, ellipse, or hypocycloid. According to the methods in the Richards patent, the integration of radiological information on one recording surface in order to obtain one lamina is replaced with a discrete series of exposures at discrete positions on the laminagraphic curve. The discrete series is then used to observe any lamina by superimposing the image information with relative planar shifts. One such method is the direct superposition of N films on a display and sliding the films over each other in order to view different lamina.

FIG. 1 displays the requirement for translating and superimposing a selected group of seven films 10 which have been exposed according to the linear motion of laminagraphy and photographically fixed. The films in the stack must be moved into different positions as shown to get the progressive laminal planes desired. One film may not have to move at all while another film will move laterally more than any of the others. One method of accomplishing this effect is to cut the films in the shape of, for example, seven parallelograms as shown in FIG. 2. These parallelograms vary in configuration from 1 to 7 in FIG. 2, angling to the left in the left view and progressing to the square in the center and then to the angling to the right as shown.

The exposed and fixed films are placed in any sequence upon a viewing box 20 which provides a source of light 21. Fixed on this viewing box, as shown in FIG. 3, are two parallel guides 22, 24 spaced at G dimension which permit the films to be moved only laterally relative to the view box and to each other. The left- and right-hand borders of the films are constrained between two pins 26, 28 spaced at W dimension which project perpendicular to the view box in the same direction as the guides 22, 24. These pins can be upturned ends of legs 30, 32 formed on cross bar 34 and passing through holes in the forward wall 33 of the view box 20. The legs and the pins are guided in slots 36, 38 in the view box. By moving cross bar 34 these two pins 26, 28 are made to move in parallel paths in slots 36, 38 which are at right angles to the fixed guides. This motion of the pins causes each parallelogram-shaped film 10 to move laterally by an amount determined by the angle of its sides. A rectangular film would experience no lateral movement while the pins 26, 28 are moved along its edges. It is by this means that each film in the sandwich can be moved laterally the proper distance and direction, relative to the other films, so that images of details in each parallel plane within the object can be brought successively into focus.

Cutting of the films into parallelograms requires a relationship between the X-ray equipment or other source of penetrating radiation, the subject, and the parallelogram angles. A preferred method for obtaining the angles is shown in FIG. 4. Three reference absorbers, shown as small lead balls A, B, and C are placed around the subject 50. Markers A and B are placed in the direction of motion of the source 52 shown. They are placed in an approximate line and at a height from the table approximately at the lower plane or lamina of interest in the subject. The images of the two A-B markers appear on or near the edge of each of a plurality of output films 54. The third marker C is placed at or near the upper lamina of interest and across the width of the film. As the source 52 and film 54 are moved laminagraphically to take the sequence of exposures, the marker C will appear at different locations along a line directed along the A-B direction as shown in FIG. 5. The three markers must be placed at positions for which all positions of the source and film to be used result in the exposure of these markers on the output recording surfaces.

FIG. 5 shows examples of the three marker arrangement as they might appear on output films. The A-B markers are used to make a first cut (FIG. 6) at one edge 60 parallel to a line drawn between the two markers A-B. Concurrently or separately a second cut is made on the opposite edge 62 to a width G corresponding to the width of the parallel fixed guide runners 22, 24 to be used with the display. One of the A-B markers and the remaining unused marker are used to make a third cut at a side edge 64 corresponding to the parallelogram angle. The final edge 66 is formed by a fourth cut parallel to the parallelogram edge but displaced a fixed distance as measured across one of the A-B edges previously established. This distance is equal to the moving pin separation W in the display.

FIG. 6 shows a preferred order for making the desired cuts although many variations are possible.

In a few situations because of the nature of the subject it may not be convenient to place the third marker at the desired upper lamina. A variation on the method is to mount a moving third marker between the source and the sensitive sheets. The motion of the marker is adjusted so that the apparent plane of the marker will be the plane established by the source rotation. This may be adjusted according to usual laminagraphic techniques.

The system described herein can be used with radiographic units whose source can be moved either manually or automatically. Various attachments for converting such units into laminagraphic units are also well known in the art and can also be used. Because the marker absorbers are distributed around the subject and may remain stationary during exposure of the multiple recording surfaces, the source position, relative to the film is not important. The necessary information for cutting the films is obtained by the images of the markers as exposed on the output. Therefore, most existing penetrating sources can be used in applying this invention and the methods of the referenced Richards patent.

The films, as cut according to the data obtained by the imposed markers, may then be placed in a viewing device in an overslide array as described in connection with FIGS. 3A to 3D and the pins 26, 28 moved in the slots 36, 38. As the pins progress, the multiple films will be moved over each other and the light from the light box 20 will show various lamina through the three-dimensional subject.

Thus, the films are exposed seriatim as the source moves relative to the object and a record is made of the angulation at each exposure. This record can be used to cut the film wherein it is readied for the exposure apparatus which moves the film in an overlay array linearly on an X-axis in a relative motion dependent on the angulation of the individual exposure shots. A relatively simple apparatus provides the complex motion on the Y-axis required for most effective display of the various laminal planes of the object exposed.

What is claimed as new is as follows:

1. A method of preparing records for display of variable depth laminagraphy which comprises: disposing a subject to be radiographed on a support member between a source of penetrating radiation and a radiation sensitive recording medium in the field of radiation from said source, moving said source of penetrating radiation through successive positions disposed in a predetermined linear path relative to said subject while rotating said source so that said field of radiation is rotated about an axis adjacent said recording medium, maintaining said recording medium in that part of the field of radiation which penetrates said subject in the area of interest to record an image of said subject in a plurality of exposures as said source moves through a plurality of positions in the predetermined path, exposing the subject and the recording medium to radiation at plural arbitrary points of differing angulation about said axis along said path, changing the recording medium after each exposure to produce a set of radiographic records, and recording the relative angulation for the point of exposure on each radiographic record.

2. A method as defined in claim 1 including the additional step of cutting each radiographic record along at least two edges at angles determined by the record of the relative angulation on each radiographic record to prepare said records for an overlay laminagraphic display.

3. A method as defined in claim 1 including the additional step of cutting each radiographic record in the form of a parallelogram, two opposed sides being related to the other opposed sides by angles determined by the record of the relative angulation of each exposure to prepare said records for an overlay laminagraphic display.

4. A method as defined in claim 1 including the additional step of moving each radiographic record relative to the other in accordance with said relative angulation for each individual record in an overlay display to provide a laminagraphic display.

5. A method as defined in claim 1 wherein said step of recording the relative angulation comprises the step of establishing a set of radiation opaque markers with such markers in planes spaced in the direction of said rays to cast shadows which are recorded on the recording medium.

6. A method as defined in claim 1 wherein said step of recording the relative angulation is performed by disposing at least two radiation opaque markers in one plane located at one extreme lamina of interest of said subject, and at least one is located in a plane at the other extreme lamina of interest of said subject.

7. The method of producing a radiographic view of a selected lamina in a subject comprising the steps of: disposing a subject to be radiographed on a support member between a radiation source and a recording medium in the field of radiation from said source, moving the source in a straight line path relative to the subject while rotating said source so that said field of radiation is rotated about an axis adjacent said recording medium, maintaining said recording medium in that part of the field of radiation which penetrates said subject in the area of interest, exposing the subject to radiation from the source at plural successive arbitrary positions in the path of movement to expose said medium to radiation penetrating said subject at successively different arbitrary angles about said axis and thereby making a radiographic record thereof, changing the recording medium after each exposure and producing a set of at least four radiographic records each taken at a different angulation of exposure, recording information with respect to each radiographic record identifying the value of the arbitrary angulation of exposure thereof, superimposing the radiographic records so that the images of the subject can be viewed and superimposed, positioning each of the radiographic records in an initial position so that the images of a selected point in said subject are in registry whereby a clear image is produced of the lamina in which said selected point resides, and linearly shifting all the radiographic records simultaneously from the initial position to produce a clear image of another lamina, each radiographic record being shifted relative to any other record in accordance with the difference in angulation of exposure, such shifting being along a line and through a distance proportional to that which it would be shifted by: (1) cutting each radiographic record into a parallelogram having a parallelogram angle corresponding to the angulation of the exposure, (2) superimposing the set of parallelogram-shaped radiographic records on each other and allowing each of them to move only along the line of source movement relative thereto during exposure of the radiographic records, and (3) causing the set of parallelogram-shaped radiographic records to move along said last-mentioned line by perpendicular movement in unison of a pair of pins engaging opposite edges of the set of parallelogram-shaped radiographic records on a line parallel to said last-mentioned line.

8. The method of producing a radiographic view of a selected lamina in a subject comprising the steps of: disposing a subject to be radiographed on a support member between a radiation source and a recording medium in the field of radiation from said source, disposing two radiation opaque markers in the vicinity of the subject at different distances from the recording medium, moving the source in a straight line path relative to the support member while rotating said source so that said field of radiation is rotated about an axis adjacent said recording medium, maintaining said recording medium in that part of the field of radiation which penetrates said subject in the area of interest, exposing the subject to radiation from the source at plural successive arbitrary positions in the path of movement to expose said medium to radiation penetrating said subject and said markers at successively different arbitrary angles about said axis and thereby making a radiographic record thereof, changing the recording medium after each exposure to produce a set of radiographic records each taken at a different angle relative to said subject, superimposing the radiographic records so that the images of the subject can be viewed and superimposed, positioning the radiographic records so that the images of a selected point in said subject are in registry whereby a clear image is produced of the lamina in which said point resides, and linearly shifting the radiographic records from one relative position to another along a line parallel to the relative movement between the source and the support member, and displacement of any other radiographic record having a ratio equal to the ratio of distances along said line between the images of the markers on the one radiographic record and the images of the markers on the other radiographic record whereby a clear image is produced of successive laminae of said subject.

9. The method as defined in claim 8 wherein the step of linearly shifting the radiographic records is performed by simultaneously displacing the radiographic records from one relative position to another with the rate of displacement of one radiographic record and the rate of displacement of another radiographic record having a ratio equal to the ratio of distances in said direction between the images of the markers on the one radiographic record and the images of the markers on the other radiographic record.

10. The method as defined in claim 8 including the additional step of positioning said radiation opaque markers at first and second limits of the volume of interest in the subject between which selected laminae are to be viewed.

11. For use in variable depth laminagraphy, apparatus for recording the relative angles of exposure of a series of radiographic records comprising a radiation source and a changeable recording medium disposed in the field of radiation from the source, support means adapted to receive a subject to be radiographed in said field of radiation and defining a reference plane, means for translationally moving the source and support means relative to each other through a predetermined straight line path and for rotationally moving said source so that said field of radiation is rotated about an axis adjacent said recording medium to change the angle at which the radiation intercepts said reference plane, means for maintaining said recording medium in that part of the field of radiation which penetrates said subject in the area of interest, means disposed in said field of radiation for determining from the recording medium for each radiographic record the direction of said predetermined path of said source in its motion between positions for successive record, a first radiation opaque marker disposed in said field of radiation and spaced from the surface of said recording medium, a second radiation opaque marker disposed in said field of radiation and spaced from the surface of said recording medium at a distance different from that of the first radiation opaque marker, the opacity of said markers defining a point which is readily identifiable in the recorded image thereof, means successively effective during a single transverse of said path at plural successive arbitrary positions in the path of movement for exposing said medium to radiation penetrating said subject and said markers, whereby a line between the points of the images of the markers on each radiographic record is indicative of the angle of exposure.

12. The invention as defined in claim 11 wherein said means for determining direction of said path comprises a third radiation opaque marker disposed in alignment with one of the other radiation opaque markers along the direction of said predetermined path.

13. The invention as defined in claim 12 wherein said first marker is spaced from the surface of said recording medium at a position corresponding to one limit of the volume of interest in said subject and at least one of the second and third markers is spaced from the surface of said recording medium at a position corresponding to the other limit of the volume of interest of said subject.

* * * * *